United States Patent
Nassiri-Toussi et al.

(10) Patent No.: US 7,710,319 B2
(45) Date of Patent: May 4, 2010

(54) ADAPTIVE BEAM-STEERING METHODS TO MAXIMIZE WIRELESS LINK BUDGET AND REDUCE DELAY-SPREAD USING MULTIPLE TRANSMIT AND RECEIVE ANTENNAS

(75) Inventors: Karim Nassiri-Toussi, Belmont, CA (US); Jeffrey M. Gilbert, Palo Alto, CA (US); Chuen-Shen Shung, San Jose, CA (US); Dmitry M. Cherniavsky, San Jose, CA (US)

(73) Assignee: SiBeam, Inc., Sunnyvale, CA (US)

(*) Notice: Subject to any disclaimer, the term of this patent is extended or adjusted under 35 U.S.C. 154(b) by 114 days.

(21) Appl. No.: 11/706,711

(22) Filed: Feb. 13, 2007

(65) Prior Publication Data
US 2007/0205943 A1 Sep. 6, 2007

Related U.S. Application Data

(60) Provisional application No. 60/773,508, filed on Feb. 14, 2006.

(51) Int. Cl.
H01Q 3/00 (2006.01)
H04B 7/216 (2006.01)
H03C 7/02 (2006.01)

(52) U.S. Cl. .................. 342/377; 370/335; 455/101

(58) Field of Classification Search .............. 342/377; 370/335; 455/101
See application file for complete search history.

(56) References Cited

U.S. PATENT DOCUMENTS

| 7,340,279 | B2* | 3/2008 | Chen et al. ............. 455/562.1 |
| 2004/0209579 | A1 | 10/2004 | Vaidyananthan |
| 2006/0023669 | A1 | 2/2006 | Yamaura et al. |
| 2006/0105813 | A1* | 5/2006 | Nakao ............... 455/562.1 |

OTHER PUBLICATIONS

PCT Written Opinion for PCT/US2007/004118, mailed Aug. 28, 2007.
PCT Search Report, PCT/US2007004118, Aug. 21, 2007, 5 pages.

\* cited by examiner

*Primary Examiner*—Thomas H Tarcza
*Assistant Examiner*—Harry Liu
(74) *Attorney, Agent, or Firm*—Blakely, Sokoloff, Taylor & Zafman LLP

(57) ABSTRACT

A method and apparatus for adaptive beam-steering are disclosed. In one embodiment, the method comprises performing adaptive beam steering using multiple transmit and receive antennas, including iteratively performing a pair of training sequences, wherein the pair of training sequences includes estimating a transmitter antenna-array weight vector and a receiver antenna-array weight vector.

52 Claims, 11 Drawing Sheets

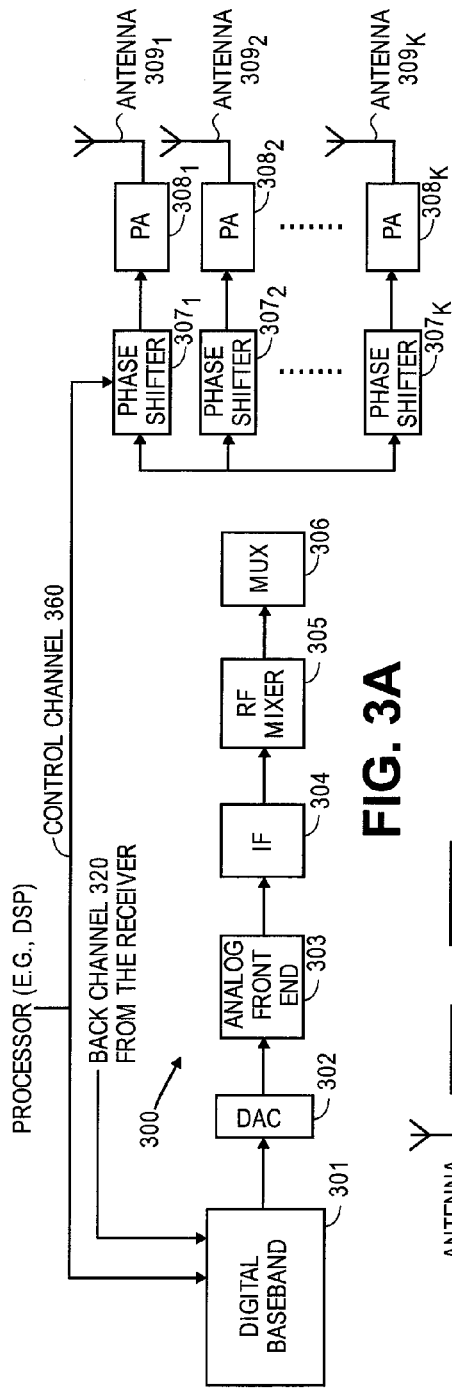
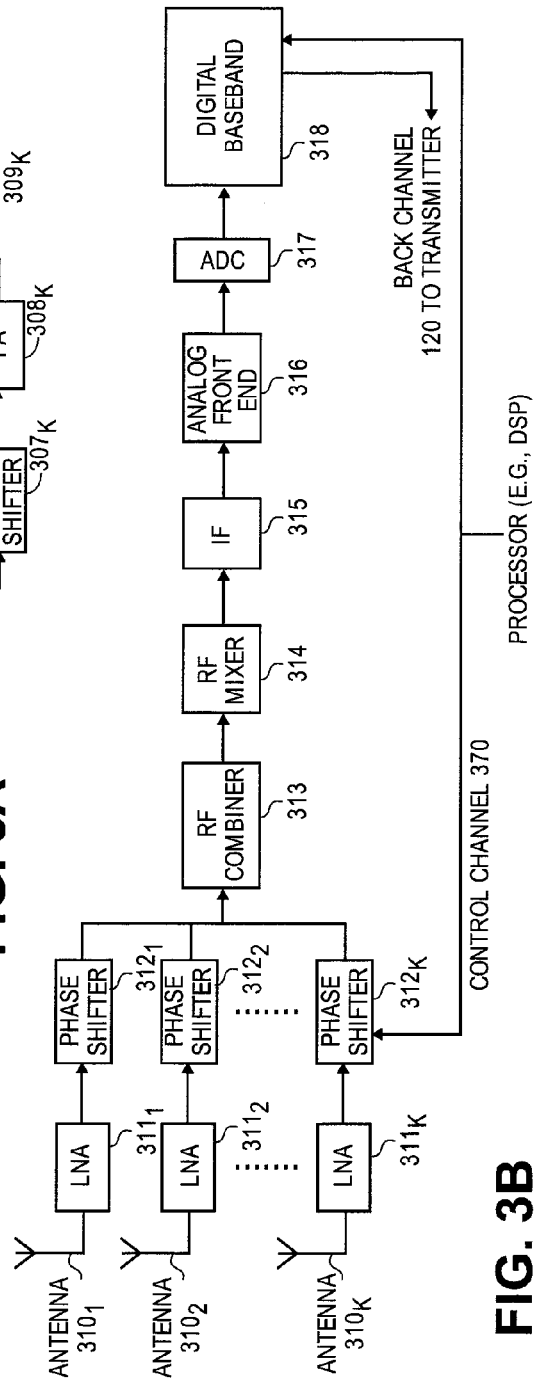
FIG. 3A
FIG. 3B

- 36x36 (Hadamard) Transfer matrix A is equal to

ADAPTIVE BEAM-STEERING METHODS TO MAXIMIZE WIRELESS LINK BUDGET AND REDUCE DELAY-SPREAD USING MULTIPLE TRANSMIT AND RECEIVE ANTENNAS

This application claims the benefit of and incorporates by reference U.S. Provisional Application No. 60/773,508, entitled "Adaptive Beam-Steering Methods to Maximize Wireless Link Budget and Reduce Delay-Spread Using Multiple Transmit and Receive Antennas," filed Feb. 14, 2006.

BACKGROUND OF THE INVENTION

In most wireless communication systems, the air link consists of the propagation channel between one transmit antenna and one receive antenna. However, it has been established that using multiple antennas at the transmitter and the receiver can significantly increase the link budget and consequently, link capacity. The drawback of this approach is that the complexity of the system can also increase dramatically. Systems with multiple transmit and receive antennas are referred to as wireless MIMO (Multi-Input Multi-Output) systems.

For MIMO systems, the increase in link budget or link capacity is achieved via one of the following approaches: increasing diversity, multiplexing, and beam-forming. When using an approach that increases diversity, similar replicas of the signal are transmitted and received by multiple antennas. These multiple transmissions are either separated (made uncorrelated) in time by using distinct delays, or in frequency by using distinct frequency offsets, or in code-space by using specific permutations and/or coding. Multiple receptions are combined using the optimal Maximal-Ratio-Combining (MRC) receiver. This approach does not require knowledge of the channel transfer function at the transmitter side. In some approaches, however, it requires significant portions of the transmit and receive data-path (analog and digital front-end) to be replicated for each antenna.

Most of the current MIMO systems follow the first (diversity) approach mentioned above. The link budget produced by this approach is roughly N times less than that resulting from beam-forming, where N is the number of antennas. Also, in most cases, the existing implementations require complex systems where entire analog and digital front-end portions of data-path are replicated per antenna. In a multiplexing scheme, accurate knowledge of the channel transfer function is used to shape the overall transmit-to-receive transfer function into separate (orthogonal) transmission links, over which data is multiplexed by using proper coding and power distribution based on the water-filling principle (more power and data over stronger links). As mentioned, this approach requires some knowledge of the channel transfer function at the transmitter side. It also requires significant portions of the transmit and receive data-path (analog and digital) to be replicated for each antenna. However, if optimally-designed, it can provide maximum capacity.

There are implementations based on the multiplexing approach, but their complexity is rather prohibitive for consumer and mobile wireless applications, unless the dimension of the MIMO system, i.e. the number of antennas, are limited, which in turn limits the maximum achievable link budget increase. In a beam-forming approach, accurate knowledge of the channel transfer function is used to focus the transmission over the strongest subspace, referred to as eigenvector, of the overall transmit-to-receive channel. The signal is then transmitted over that subspace. This is accomplished by proper adjustment of the signal phase, and possibly gain, for each transmit and receive antenna separately. This scheme clearly requires some knowledge of the channel transfer function at the transmitter side. However, it can ideally be implemented with replicating only a subset of the analog data-path, and therefore can require much simpler implementation, and/or allow a larger number of antennas to be used. It also provides better link budget than the increasing diversity approach described above and for channels that are highly correlated can approach the capacity of the multiplexing method described above. This method requires the transmission bandwidth to be a small fraction of the carrier frequency. Note that multiplexing can be accomplished via parallel beam-forming along the various eigenvectors of the transmit-to-receive channel.

Beam-forming implementations can mostly be found in radar applications, where firstly the transmitter and receiver units are the same, and secondly the objective of beam-forming is completely different from link budget or link capacity maximization. Other beam-forming proposals use direct Singular-Value Decomposition techniques that result in very complex implementations that are not suitable for consumer and mobile wireless applications, and consequently put limits on the dimension of the MIMO system, i.e. the number of antennas, and hence, the maximum achievable link budget increase.

SUMMARY OF THE INVENTION

A method and apparatus for adaptive beam-steering are disclosed. In one embodiment, the method comprises performing adaptive beam steering using multiple transmit and receive antennas, including iteratively performing a pair of training sequences, wherein the pair of training sequences includes estimating a transmitter antenna-array weight vector and a receiver antenna-array weight vector.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 3A and 3B illustrate the various Beam-Search steps.

DETAILED DESCRIPTION OF THE PRESENT INVENTION

Figure 1:
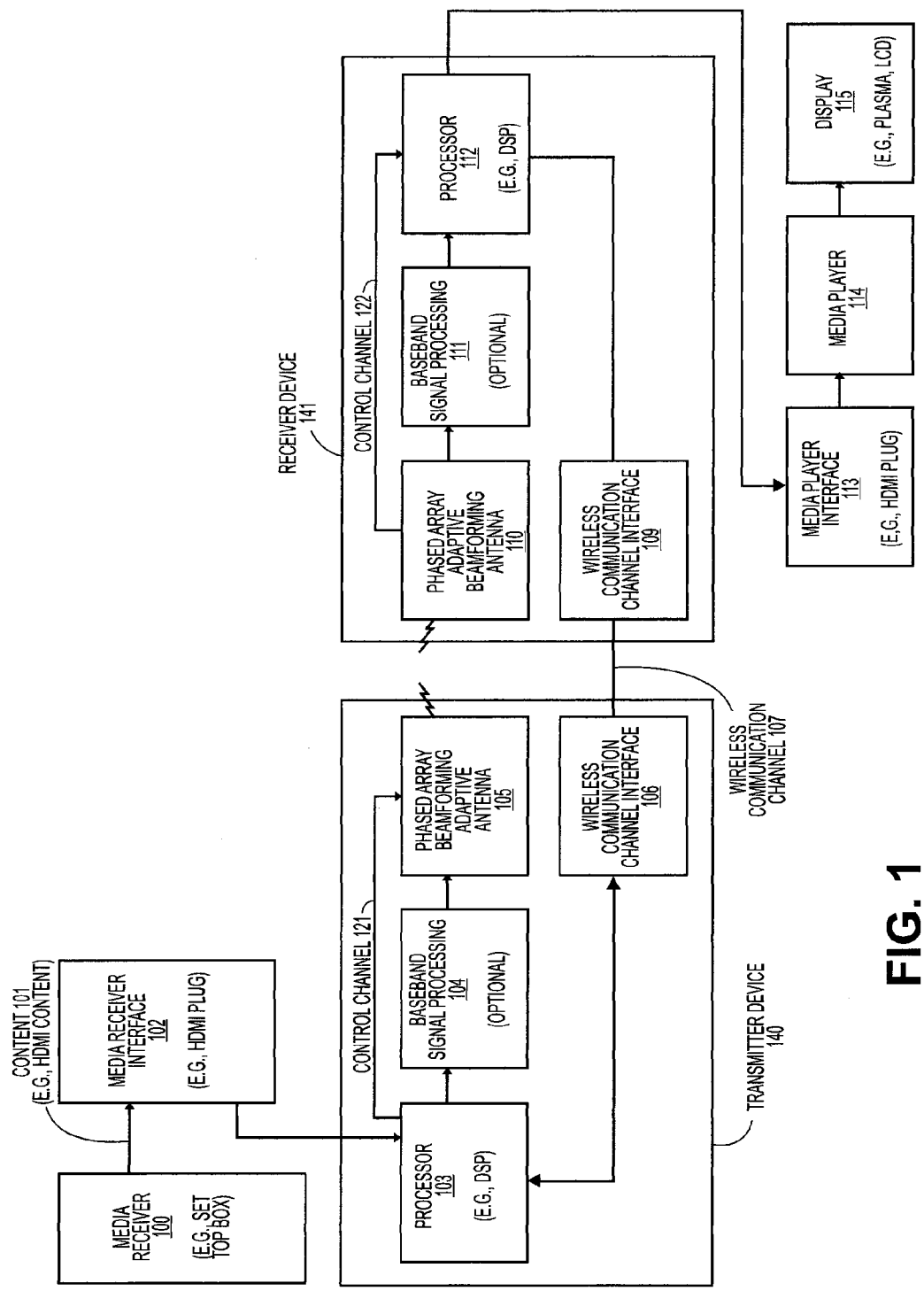
FIG. 1 is a block diagram of one embodiment of a communication system

An efficient and adaptive technique to perform beam-forming for time-varying propagation channels with reduced, and potentially minimum, complexity and increased, and potentially maximum, gain. As opposed to existing solutions, beam-forming is performed without directly performing Singular-Value Decomposition (SVD), which is very complex to implement. Instead the optimum channel eigenvector, or subspace, is obtained via an adaptive iterative scheme.

A secondary effect of beam-forming is that the resulting beam-formed channel would normally have shorter delay-spread, meaning that the Inter-Symbol Interference (ISI) window will also be shorter.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory, or equivalent electronic computing device. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes by using digital components, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming, or digital design, languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Example of a Communication System

FIG. 1 is a block diagram of one embodiment of a communication system. Referring to FIG. 1, the system comprises media receiver 100, a media receiver interface 102, a transmitting device 140, a receiving device 141, a media player interface 113, a media player 114 and a display 115.

Media receiver 100 receives content from a source (not shown). In one embodiment, media receiver 100 comprises a set top box. The content may comprise baseband digital video, such as, for example, but not limited to, content adhering to the HDMI or DVI standards. In such a case, media receiver 100 may include a transmitter (e.g., an HDMI transmitter) to forward the received content.

Media receiver 100 sends content 101 to transmitter device 140 via media receiver interface 102. In one embodiment, media receiver interface 102 includes logic that converts content 101 into HDMI content. In such a case, media receiver interface 102 may comprise an HDMI plug and content 101 is sent via a wired connection; however, the transfer could occur through a wireless connection. In another embodiment, content 101 comprises DVI content.

In one embodiment, the transfer of content 101 between media receiver interface 102 and transmitter device 140 occurs over a wired connection; however, the transfer could occur through a wireless connection.

Transmitter device 140 wirelessly transfers information to receiver device 141 using two wireless connections. One of the wireless connections is through a phased array antenna with adaptive beam-forming. The other wireless connection is via wireless communications channel 107, referred to herein as the back channel. In one embodiment, wireless communications channel 107 is uni-directional. In an alternative embodiment, wireless communications channel 107 is bi-directional. In one embodiment, the back channel can use some or all of the same antennas as the forward beam-formed channel (part of 105). In another embodiment, the two sets of antennas are disjoint.

Receiver device 141 transfers the content received from transmitter device 140 to media player 114 via an interface such as a media player interface 113. In one embodiment, the transfer of the content between receiver device 141 and media player interface 113 occurs through a wired connection; however, the transfer could occur through a wireless connection. In one embodiment, media player interface 113 comprises an HDMI plug. Similarly, the transfer of the content between media player interface 113 and media player 114 occurs through a wired connection; however, the transfer could occur through a wireless connection. The transfer could also occur through a wired or wireless data interface that was not a media player interface.

Media player 114 causes the content to be played on display 115. In one embodiment, the content is HDMI content and media player 114 transfer the media content to display via a wired connection; however, the transfer could occur through a wireless connection. Display 115 may comprise a plasma display, an LCD, a CRT, etc.

Note that the system in FIG. 1 may be altered to include a DVD player/recorder in place of a DVD player/recorder to receive, and play and/or record the content. The same techniques can be used in non-media data applications as well.

Figure 2:
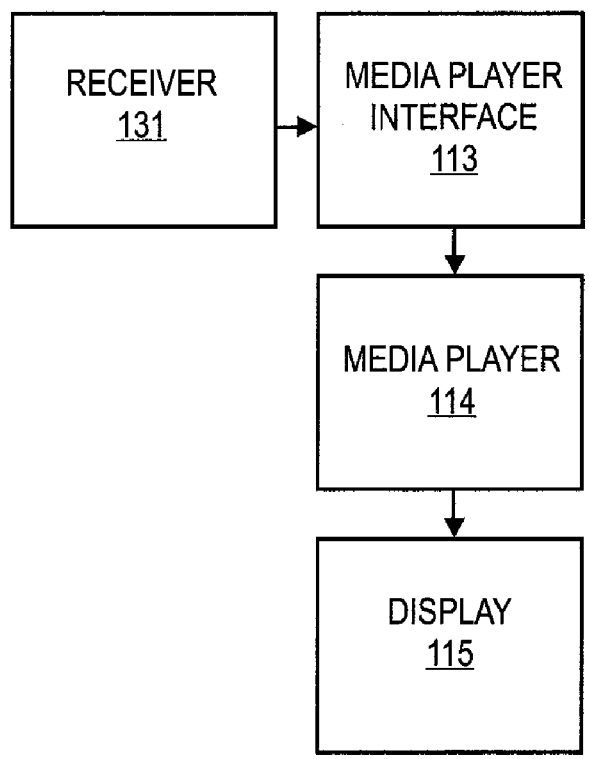
FIG. 2 is a block diagram of one embodiment of an integrated device.

In one embodiment, transmitter 140 and media receiver interface 102 are part of media receiver 100. Similarly, in one embodiment, receiver 141, media player interface 113, and media player 114 are all part of the same device. In an alternative embodiment, receiver 140, media player interface 113, media player 114, and display 115 are all part of the display. An example of such a device is shown in FIG. 2.

In one embodiment, transmitter device 140 comprises a processor 103, an optional baseband processing component 104, a phased array antenna 105, and a wireless communication channel interface 106. Phased array antenna 105 comprises a radio frequency (RF) transmitter having a digitally controlled phased array antenna coupled to and controlled by processor 103 to transmit content to receiver device 141 using adaptive beam-forming.

In one embodiment, receiver device 141 comprises a processor 112, an optional baseband processing component 111, a phased array antenna 110, and a wireless communication channel interface 109. Phased array antenna 110 comprises a radio frequency (RF) transmitter having a digitally controlled phased array antenna coupled to and controlled by processor 112 to receive content from transmitter device 140 using adaptive beam-forming.

In one embodiment, processor 103 generates baseband signals that are processed by baseband signal processing 104 prior to being wirelessly transmitted by phased array antenna 105. In such a case, receiver device 141 includes baseband signal processing to convert analog signals received by phased array antenna 110 into baseband signals for processing by processor 112. In one embodiment, the baseband signals are orthogonal frequency division multiplex (OFDM) signals.

In one embodiment, transmitter device 140 and/or receiver device 141 are part of separate transceivers.

Transmitter device 140 and receiver device 141 perform wireless communication using a phased array antenna with adaptive beam-forming that allows beam steering. Beam-forming is well known in the art. In one embodiment, processor 103 sends digital control information to phased array antenna 105 to indicate an amount to shift one or more phase shifters in phased array antenna 105 to steer a beam formed thereby in a manner well-known in the art. Processor 112 uses digital control information as well to control phased array antenna 110. The digital control information is sent using control channel 121 in transmitter device 140 and control channel 122 in receiver device 141. In one embodiment, the digital control information comprises a set of coefficients. In one embodiment, each of processors 103 and 112 comprises a digital signal processor.

Wireless communication link interface 106 is coupled to processor 103 and provides an interface between wireless communication link 107 and processor 103 to communicate antenna information relating to the use of the phased array antenna and to communicate information to facilitate playing the content at the other location. In one embodiment, the information transferred between transmitter device 140 and receiver device 141 to facilitate playing the content includes encryption keys sent from processor 103 to processor 112 of receiver device 141 and one or more acknowledgments from processor 112 of receiver device 141 to processor 103 of transmitter device 140.

Wireless communication link 107 also transfers antenna information between transmitter device 140 and receiver device 141. During initialization or tuning of the phased array antennas 105 and 110, wireless communication link 107 transfers information to enable processor 103 to select a direction for the phased array antenna 105. In one embodiment, the information includes, but is not limited to, antenna location information and performance information corresponding to the antenna location, such as one or more pairs of data that include the position of phased array antenna 110 and the signal strength of the channel for that antenna position. In another embodiment, the information includes, but is not limited to, information sent by processor 112 to processor 103 to enable processor 103 to determine which portions of phased array antenna 105 to use to transfer content.

When the phased array antennas 105 and 110 are operating in a mode during which they may transfer content (e.g., HDMI content), wireless communication link 107 transfers an indication of the status of communication path from the processor 112 of receiver device 141. The indication of the status of communication comprises an indication from processor 112 that prompts processor 103 to steer the beam in another direction (e.g., to another channel). Such prompting may occur in response to interference with transmission of portions of the content. The information may specify one or more alternative channels that processor 103 may use.

In one embodiment, the antenna information comprises information sent by processor 112 to specify a location to which receiver device 141 is to direct phased array antenna 110. This may be useful during initialization when transmitter device 140 is telling receiver device 141 where to position its antenna so that signal quality measurements can be made to identify the best channels. The position specified may be an exact location or may be a relative location such as, for example, the next location in a predetermined location order being followed by transmitter device 140 and receiver device 141.

In one embodiment, wireless communications link 107 transfers information from receiver device 141 to transmitter device 140 specifying antenna characteristics of phased array antenna 110, or vice versa. In one embodiment, communications link 107 transfers information from receiver device 141 to transmitter device 140 that can be used to control phased array antenna 105.

An Example of a Transceiver Architecture

One embodiment of a transceiver is described below. The transceiver includes transmit and receive paths for a transmitter and receiver, respectively. In one embodiment, the transmitter, for use in communication with a receiver, comprises a processor and a phased array beamforming antenna. The processor controls the antenna to perform adaptive beam steering using multiple transmit antennas in conjunction with receive antennas of the receiver by iteratively performing a set of training operations. One of the training operations comprises the processor causing the phased array beamforming antenna to transmit a first training sequence while a receive antenna-array weight vector of the receiver is set and a transmitter antenna-array weight vector switches between weight vectors with a set of weight vectors. Another of the training operations comprises the processor causing the phased array beamforming antenna to transmit a second training sequence while a transmitter antenna-array weight vector is set as part of a process to calculate the receive antenna-array weight vector.

In one embodiment, the receiver, for use in communication with a transmitter, comprises a processor and a phased array beamforming antenna. The processor controls the antenna to perform adaptive beam steering using multiple receive antennas in conjunction with transmit antennas of the transmitter by iteratively performing a set of training operations. One of the training operations comprises the processor setting a receive antenna-array weight vector during a process for estimating a transmit antenna-array weight vector by having the transmitter transmit a first training sequence while the receive antenna-array weight vector is set. Another of the training operations comprises the processor calculate the receive antenna-array weight vector when the transmitter transmits a second training sequence while the transmitter antenna-array weight vector is set.

FIGS. 3A and 3B are block diagrams of one embodiment of a transmitter device and a receiver device, respectively, that are part of an adaptive beam forming multiple antenna radio system containing of FIG. 1. Transceiver 300 includes multiple independent transmit and receive chains and performs phased array beam forming using a phased array that takes an identical RF signal and shifts the phase for one or more antenna elements in the array to achieve beam steering.

Referring to FIG. 3A, digital baseband processing module (e.g., Digital Signal Processor (DSP)) 301 formats the content and generates real time baseband signals. Digital baseband processing module 301 may provide modulation, FEC coding, packet assembly, interleaving and automatic gain control.

Digital baseband processing module 301 then forwards the baseband signals to be modulated and sent out on the RF portion of the transmitter. In one embodiment, the content is modulated into OFDM signals in a manner well known in the art.

Digital-to-analog converter (DAC) 302 receives the digital signals output from digital baseband processing module 301 and converts them to analog signals. In one embodiment, the signal outputs from DAC 302 are between 0-1.7 GHz. Analog front end 303 receives the analog signals and filters it with an appropriate low-pass image-rejection filter and amplifies it accordingly. The IF module 304 receives the output of analog front end 303 and up-converts it to the IF frequency. In one embodiment, the IF frequency is between 2-15 GHz.

RF mixer 305 receives signals output from IF amplifier 304 and combines them with a signal from a local oscillator (LO) (not shown) in a manner well-known in the art. The signals output from mixer 305 are at an intermediate frequency. In one embodiment, the intermediate frequency is between 2-15 GHz.

Multiplexer 306 is coupled to receive the output from mixer 305 to control which phase shifters $307_{1-N}$ receive the signals. In one embodiment, phase shifters $307_{1-N}$ are quantized phase shifters. In an alternative embodiment, phase shifters $307_{1-N}$ may be replaced by IF or RF amplifiers with controllable gain and phase. In one embodiment, digital baseband processing module 201 also controls, via control channel 360, the phase and magnitude of the currents in each of the antenna elements in phased array antenna to produce a desired beam pattern in a manner well-known in the art. In other words, digital baseband processing module 201 controls the phase shifters $307_{1-N}$ of phased array antenna to produce the desired pattern.

Each of phase shifters $307_{1-K}$ produce an output that is sent to one of power amplifiers $308_{1-N}$, which amplify the signal. The amplified signals are sent to an antenna array that has multiple antenna elements $309_{1-N}$. In one embodiment, the signals transmitted from antennas $309_{1-N}$ are radio frequency signals between 56-64 GHz. Thus, multiple beams are output from the phased array antenna.

With respect to the receiver, antennas $310_{1-N}$ receive the wireless transmissions from antennas $309_{1-NK}$ and provide them to phase shifters $312_{1-N}$, via low-noise amplifiers $311_{1-N}$, respectively. As discussed above, in one embodiment, phase shifters $312_{1-N}$ comprise quantized phase shifters. Alternatively, phase shifters $312_{1-N}$ may be replaced by complex multipliers. Phase shifters $312_{1-N}$ receive the signals from antennas $310_{1-N}$, which are combined by RF combiner 313 to form a single line feed output. In one embodiment, a multiplexer is used to combine the signals from the different elements and output the single feed line. The output of RF combiner 313 is input to RF mixer 314.

Mixer 314 receives the output of the RF combiner 313 and combines it with a signal from a LO (not shown) in a manner well-known in the art. In one embodiment, the output of mixer 314 is a signal with the IF carrier frequency of 2-15 GHz. The IF module then down-converts the IF signal to the baseband frequency. In one embodiment, there are I and Q signals, which are between 0-1.7 GHz.

Analog-to-digital converter (ADC) 316 receives the output of IF 315 and converts it to digital form. The digital output from ADC 316 is received by digital baseband processing module (e.g., DSP) 318. Digital baseband processing module 318 restores the amplitude and phase of the signal. Digital baseband processing module 318 may provide demodulation, packet disassembly, de-interleaving and automatic gain.

In one embodiment, each of the transceivers includes a controlling microprocessor that sets up control information for the digital baseband processing module (e.g., DSP). The controlling microprocessor may be on the same die as the digital baseband processing module (e.g., DSP).

DSP-controlled Adaptive Beam Forming

In one embodiment, the DSPs implement an adaptive algorithm with the beam forming weights being implemented in hardware. That is, the transmitter and receiver work together to perform the beam forming in RF frequency using digitally controlled analog phase shifters; however, in an alternative embodiment, the beam-forming is performed in IF. Phase shifters $307_{1-N}$ and $312_{1-N}$ are controlled via control channel 360 and control channel 370, respectfully, via their respective DSPs in a manner well known in the art. For example, digital baseband processing module (e.g., DSP) 301 controls phase shifters $307_{1-N}$ to have the transmitter perform adaptive beam-forming to steer the beam while digital baseband processing module (e.g., DSP) 318 controls phase shifters $312_{1-N}$ to direct antenna elements to receive the wireless transmission from antenna elements and combine the signals from different elements to form a single line feed output. In one embodiment, a multiplexer is used to combine the signals from the different elements and output the single feed line. Note that processors (e.g., DSPs) that control the digital baseband processing modules, such as shown in the transmitters and receivers of FIG. 1, could be coupled to control channels 360 and 370, respectively, could be used to control phase shifters $307_{1-N}$ and $312_{1-N}$.

Digital baseband processing module (e.g., DSP) 301 performs the beam steering by pulsing, or energizing, the appropriate phase shifter connected to each antenna element. The pulsing algorithm under digital baseband processing module (e.g., DSP) 301 controls the phase and gain of each element. Performing DSP controlled phase array beam-forming is well known in the art.

The adaptive beam forming antenna is used to avoid interfering obstructions. By adapting the beam forming and steering the beam, the communication can occur avoiding obstructions which may prevent or interfere with the wireless transmissions between the transmitter and the receiver.

In one embodiment, with respect to the adaptive beam-forming antennas, they have three phases of operations. The three phases of operations are the training phase, a searching phase, and a tracking phase. The training phase and searching phase occur during initialization. The training phase determines the channel profile with predetermined sequences of spatial patterns $\{A_i\}$ and $\{B_j\}$. The searching phase computes a list of candidate spatial patterns $\{A_i\}$, $\{B_j\}$ and selects a prime candidate $\{A_{\bar{0}}, B_{\bar{0}}\}$ for use in the data transmission between the transmitter of one transceiver and the receiver of another. The tracking phase keeps track of the strength of the candidate list. When the prime candidate is obstructed, the next pair of spatial patterns is selected for use.

In one embodiment, during the training phase, the transmitter sends out a sequence of spatial patterns $\{A_i\}$. For each spatial pattern $\{A_i\}$, the receiver projects the received signal onto another sequence of patterns $\{B_j\}$. As a result of the projection, a channel profile is obtained over the pair $\{A_i\}$, $\{B_j\}$.

In one embodiment, an exhaustive training is performed between the transmitter and the receiver in which the antenna of the receiver is positioned at all locations and the transmitter sending multiple spatial patterns. Exhaustive training is well-known in the art. In this case, M transmit spatial patterns are transmitted by the transmitter and N received spatial patterns are received by the receiver to form an N by M channel matrix. Thus, the transmitter goes through a pattern of transmit sectors and the receiver searches to find the strongest signal for that transmission. Then the transmitter moves to the next sector. At the end of the exhaustive search process, a ranking of all the positions of the transmitter and the receiver and the signals strengths of the channel at those positions has been obtained. The information is maintained as pairs of positions of where the antennas are pointed and signal strengths of the channels. The list may be used to steer the antenna beam in case of interference.

In an alternative embodiment, subspace training is used in which the space is divided in successively narrow sections with orthogonal antenna patterns being sent to obtain a channel profile.

Assuming digital baseband processing module 301 (DSP) is in a stable state and the direction the antenna should point is already determined. In the nominal state, the DSP will have a set of coefficients that it sends to the phase shifters. The coefficients indicate the amount of phase the phase shifter is to shift the signal for its corresponding antennas. For example, digital baseband processing module 301 (DSP) sends a set digital control information to the phase shifters that indicate the different phase shifters are to shift different amounts, e.g., shift 30 degrees, shift 45 degrees, shift 90 degrees, shift 180 degrees, etc. Thus, the signal that goes to that antenna element will be shifted by a certain number of degrees of phase. The end result of shifting, for example, 16, 32, 36, 64 elements in the array by different amounts enables the antenna to be steered in a direction that provides the most sensitive reception location for the receiving antenna. That is, the composite set of shifts over the entire antenna array provides the ability to stir where the most sensitive point of the antenna is pointing over the hemisphere.

Note that in one embodiment the appropriate connection between the transmitter and the receiver may not be a direct path from the transmitter to the receiver. For example, the most appropriate path may be to bounce off the ceiling.

The Back Channel

In one embodiment, the wireless communication system includes a back channel 320, or link, for transmitting information between wireless communication devices (e.g., a transmitter and receiver, a pair of transceivers, etc.). The information is related to the beam-forming antennas and enables one or both of the wireless communication devices to adapt the array of antenna elements to better direct the antenna elements of a transmitter to the antenna elements of the receiving device together. The information also includes information to facilitate the use of the content being wirelessly transferred between the antenna elements of the transmitter and the receiver.

In FIGS. 3A and 3B, back channel 320 is coupled between digital baseband processing module (DSP) 318 and digital baseband processing module (DSP) 301 to enable digital baseband processing module (DSP) 318 to send tracking and control information to digital baseband processing module (DSP) 301. In one embodiment, back channel 320 functions as a high speed downlink and an acknowledgement channel.

In one embodiment, the back channel is also used to transfer information corresponding to the application for which the wireless communication is occurring (e.g., wireless video). Such information includes content protection information. For example, in one embodiment, the back channel is used to transfer encryption information (e.g., encryption keys and acknowledgements of encryption keys) when the transceivers are transferring HDMI data. In such a case, the back channel is used for content protection communications.

More specifically, in HDMI, encryption is used to validate that the data sink is a permitted device (e.g., a permitted display). There is a continuous stream of new encryption keys that is transferred while transferring the HDMI datastream to validate that the permitted device hasn't changed. Blocks of frames for the HD TV data are encrypted with different keys and then those keys have to be acknowledged back on back channel 320 in order to validate the player. Back channel 220 transfers the encryption keys in the forward direction to the receiver and acknowledgements of key receipts from the receiver in the return direction. Thus, encrypted information is sent in both directions.

The use of the back channel for content protection communications is beneficial because it avoids having to complete a lengthy retraining process when such communications are sent along with content. For example, if a key from a transmitter is sent alongside the content flowing across the primary link and that primary link breaks, it will force a lengthy retrain of 2-3 seconds for a typical HDMI/HDCP system. In one embodiment, this separate bi-directional link that has higher reliability than the primary directional link given its omni-directional orientation. By using this back channel for communication of the HDCP keys and the appropriate acknowledgement back from the receiving device, the time consuming retraining can be avoided even in the event of the most impactful obstruction.

In the active mode, when the beam-forming antennas are transferring content, the back channel is used to allow the receiver to notify the transmitter about the status of the channel. For example, while the channel between the beam-forming antennas is of sufficient quality, the receiver sends information over the back channel to indicate that the channel is acceptable. The back channel may also be used by the receiver to send the transmitter quantifiable information indicating the quality of the channel being used. If some form of interference (e.g., an obstruction) occurs that degrades the quality of the channel below an acceptable level or prevents transmissions completely between the beam-forming antennas, the receiver can indicate that the channel is no longer acceptable and/or can request a change in the channel over the back channel. The receiver may request a change to the next channel in a predetermined set of channels or may specify a specific channel for the transmitter to use.

In one embodiment, the back channel is bi-directional. In such a case, in one embodiment, the transmitter uses the back channel to send information to the receiver. Such information may include information that instructs the receiver to position its antenna elements at different fixed locations that the transmitter would scan during initialization. The transmitter may specify this by specifically designating the location or by indicating that the receiver should proceed to the next location designated in a predetermined order or list through which both the transmitter and receiver are proceeding.

In one embodiment, the back channel is used by either or both of the transmitter and the receiver to notify the other of specific antenna characterization information. For example, the antenna characterization information may specify that the antenna is capable of a resolution down to 6 degrees of radius and that the antenna has a certain number of elements (e.g., 32 elements, 64 elements, etc.).

In one embodiment, communication on the back channel is performed wirelessly by using interface units. Any form of wireless communication may be used. In one embodiment, OFDM is used to transfer information over the back channel. In another embodiment, CPM is used to transfer information over the back channel.

Beam-forming Overview

In one embodiment, the communication system implements beam-forming with the following elements: a beam-search process; a beam-tracking process; and a beam-steering state machine. The beam search and beam tracking are used to compensate for the time-variation of the wireless channel and the possible obstruction of narrow beams. When called, the beam-search process finds the beam direction that maximizes the link budget. The obtained beam direction is then used for beam-forming. After the beam-search process has resulted in optimal beam-forming, the beam-tracking process tracks the beam versus small time-variations in the channel transfer function. The beam-steering state machine uses an arbitrary bad link detection mechanism (which can based on payload or beam-tracking results) to detect whether the Signal-to-Noise Ratio of the current link is below a desired threshold. For purposes herein, a bad link means that current beam direction is obstructed, and subsequently a new beam-search is scheduled to find the next best beam direction.

Figure 4:
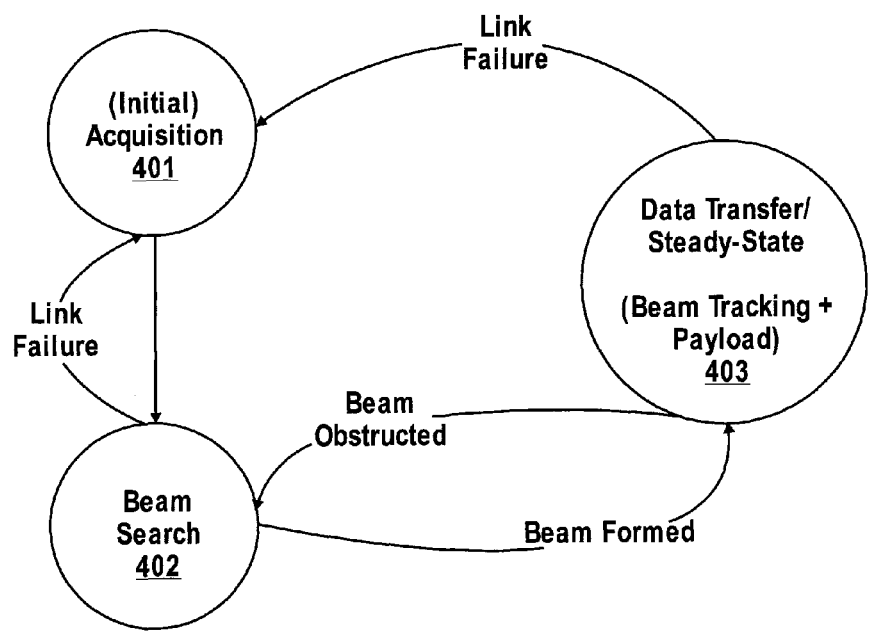
FIG. 4 illustrates one embodiment of a beam-steering state machine.

FIG. 4 illustrates one embodiment of a beam-steering state machine. Referring to FIG. 4, state machine 400 includes an acquisition (initial/idle) state 401, a beam search state 402, and a steady-state, or data transfer state, 403. The beam steering process begins in acquisition state 401. In one embodiment, acquisition state 401 is only entered once during link setup. After initial acquisition, state machine 400 transitions to beam search state 402 to perform the beam search. Beam search state 402 is also entered as soon as a source (e.g., a transmitter) or destination (e.g., a receiver) determines that a channel is considered bad (e.g., beam obstructed) (based on one or more metrics). Note that in one embodiment, the beam search is scheduled regularly (e.g., every 0.5-2 sec) during data transfer state 403. This may be useful in based of the beam being blocked.

After the beam search is successful, state machine 400 transitions into steady-state 403 where data transfer operations are performed. In one embodiment, this includes beam tracking at predetermined intervals (e.g., every 1-2 msec). In one embodiment, the beam tracking is a shortened version of the beam search process. These may be scheduled or based on request.

If there is a link failure that occurs when beam steering state machine 400 is in either beam search state 402 or data transfer state 403, then beam steering state machine 400 transitions to acquisition state 401.

In one embodiment, beam-forming at the transmitter is performed by rotating the phase of the RF-modulated signal individually for each RF power amplifier and transmit antenna set, where phase rotation is described by the following equation:

$$A(t)\cos(2\pi f_c t + \varphi(t)) \xrightarrow[\text{rotate by } \theta]{} A(t)\cos(2\pi f_c t + \varphi(t) + \theta)$$

and the rotation angle $\theta$ is quantized to 2-4 bits. This may be achieved using quantized phase shifters.

Similarly, in one embodiment, beam-forming at the receiver is performed by rotating the phase of the received RF-modulated signal after each receive antenna and Low-Noise Amplifier (LNA) set, and then combining the phase-rotated signals.

It should be noted that in one embodiment, the receive antennas are coupled to one or more digitization paths, and the number of digitization paths is less than the number of receive antennas. Also, in one embodiment, the transmit antennas are coupled to one or more transmit signal generation paths, and the number of transmit signal generation paths are less than the number of transmit antennas.

An Example of a Beam-Search Process

In one embodiment, the beam-search process consists of two stages: timing recovery and an iterative beam-search. In the timing recovery stage, arrival time (delay) of the beam/ray with maximum gain is estimated. In one embodiment, delay estimation is performed by transmitting a known symbol sequence over the air and matching that sequence at the receiver via a matched filter. To maximize the signal-to-noise ratio, transmit antenna phases are set equal to columns of the N×N Hadamard matrix, H, one column at a time, where H has the following properties:

$$H(i,j) \in \{-1,1\}, H^T H = N I_{N \times N}$$

where $H^T$ is transpose of H, and $I_{N \times N}$ is the N×N identity matrix. Transmit antenna phases are swept through N columns of H (set equal to one at a time) P (e.g., 3) times, where each time a different receive antenna phase pattern is used. Receive antenna phase patterns are selected such that the corresponding beams cover the entire space. The receiver matched filter correlates the received signal, r(k), with the transmitted sequence, x(k), as described by the following equation, where the pattern is L symbol long:

$$y(k) = \sum_{i=0}^{L-1} r(k+i)x(i)$$

The time delay that results in a maximum matched-filter output energy, after it is summed over all transmit and receive antenna phase patterns, is selected as the time-delay of the maximum gain beam/ray. In addition, the receive antenna phase pattern, for which the matched-filter output at the selected time-delay has maximum energy, after it is summed over all transmit antenna phase patterns, is also selected.

At the next stage, a beam-search iterative process is used that, in one embodiment, alternatively changes transmit and receive phase patterns for a total of 2M (even) number (e.g., 4, 6, 8 or 10) of stages. In almost all cases, transmit and receive phase patterns converge towards the optimum values corresponding to the maximum-gain beam direction. In some isolated cases, the transmit and receive phase patterns may fluctuate between different phase patterns that correspond to similar beam-forming gains.

Figure 8:
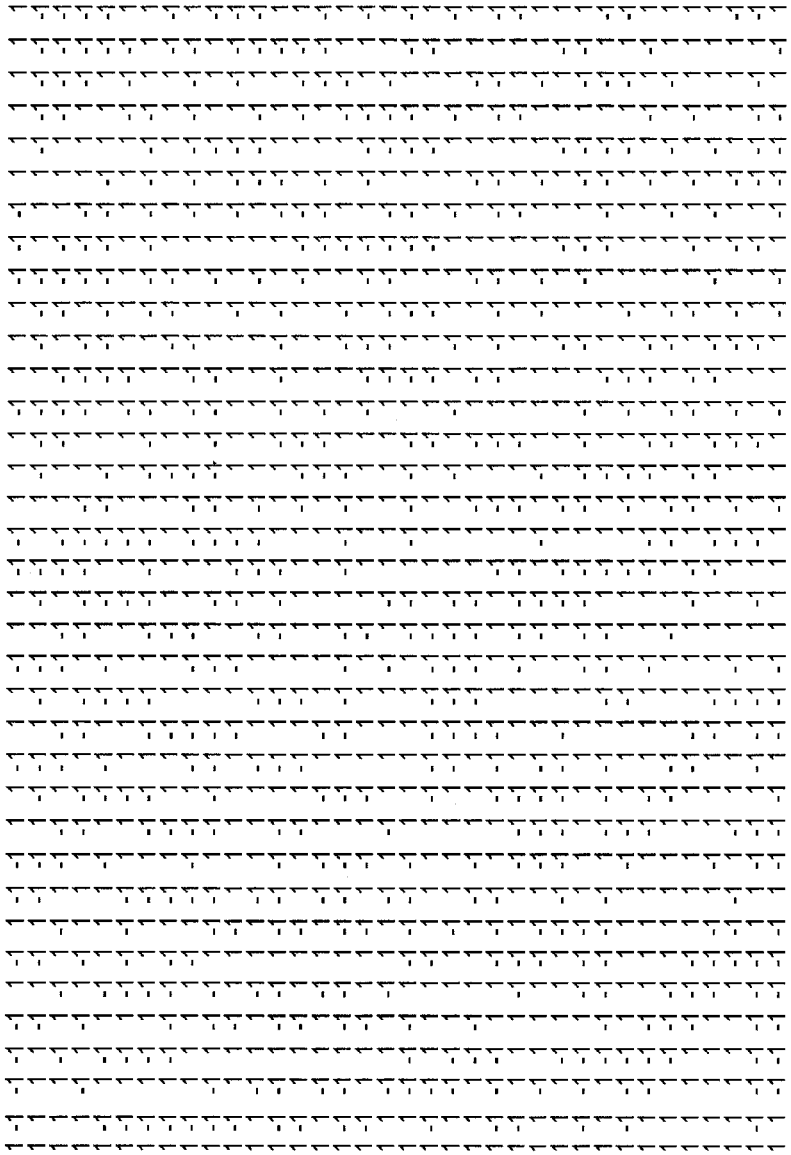
FIG. 8 is an example of a Hadamard matrix.

For the first iteration, the receive phase pattern is set to one of the P phase patterns that was selected at the end of the last timing-recovery stage. In other words, the receiver phase shifts are set to an ith initial value (for i=1, 2, 3, etc.). In one embodiment, the receive phase shifts are set by setting values of an antenna-array weight vector (AWV). The transmit pattern, on the other hand, is set equal to N columns of the Hadamard Matrix H one at a time. An example of a 36×36 Hadamard matrix is given in FIG. 8. Note that for a certain number of antennas, another unitary matrix could be used. Also, note that in one embodiment, the antenna-array weight vectors (AWV) for the receiver and the transmitter are complex weight vectors that can have magnitude and/or phase information. In one embodiment, the weight vectors are quantized phase shift vectors.

The transmitter transmits known symbol sequence over the air, which is used to estimate resulting Single-Input Single-Output (SISO) channel transfer functions from the RF-modulated signal before N transmit antenna phase rotations to the combined signal after N receive antenna phase rotations. During this stage, the transmitter phased array antenna switches between phase vectors derived from columns of matrix H, which span the entire space. In one embodiment, the transmitter antenna array weight vector (AWV) includes 36 weight vectors. For each transmit phase pattern, the received signal is correlated with the transmitted symbol sequence at the selected optimum time-delay. The complex-valued correlator output, $\hat{h}=Ae^{j\Phi}$, is then used as the estimate of the corresponding channel transfer function. Thus, the N-Tx by 1-Rx channel gains per each delay corresponding to the receiver phase shifts are sequentially measured and the maximum-energy delay (e.g., cluster) is selected for the best initial value.

Next, the vector of N complex-valued channel estimates is complex-conjugated and multiplied by matrix H. Angles of the complex-valued elements of this vector are then quantized into 2-4 bits, forming a vector of quantized phases. This vector is referred to herein as the MRC-based transmitter quantized phase shift (QPS) vector (i.e., the transmitter AWV) and is sent back to the transmitter via a reverse wireless channel such as the back channel described above, where it is used as the fixed transmit phase pattern for the next part of the first iteration. In one embodiment, the index of the transmitter AWV that produces the strongest signal at the receiver is also sent back to the transmitter via the reverse channel.

For the next part of the first iteration, the transmit phase pattern is set equal to the quantized phase vector calculated at the end of last iteration. That is, the transmitter phase shifts are set to the values calculated in the first part of the iteration that is for tuning of the transmitter AWV. The receive phase pattern, on the other hand, is set equal to the N columns of H one at a time. Transmitting the same symbol sequence and using the same correlation procedure, SISO channel transfer functions are estimated for each receive phase pattern. In other words, the 1-Tx by N-Rx channel gains are sequentially measured at the receiver for maximum-energy delay and an estimate for the equivalent 1×M channel.

Similarly, the vector of N complex-valued channel estimates is complex-conjugated and multiplied by H. Angles of the complex-valued elements of this vector are then quantized into 2-4 bits, forming a vector of quantized phases. This vector is referred to as the MRC-based receiver quantized phase shift (QPS) vector (i.e., the receiver AWV). This AWV vector is used in the receiver as the fixed receive phase pattern for the next iteration. That is, the receiver phase shifts (weights) are set to these calculated values.

Thus, the same steps are repeated a number of times (e.g., 3, 4, etc.), where alternatively transmit or receive phase patterns are set equal to calculated quantized phase vectors from the previous iteration, while the patterns for the opposite operation, i.e., receive or transmit patterns, are set equal to N columns of H one at a time.

At the end of the iterations, the calculated transmit and receive phase vectors are used to form a beam in the optimum direction.

In one embodiment, the beam search (and beam tracking) signal is an OQPSK signal at $F_s/2$ sampling frequency, where $F_s$ is the OFDM sampling rate.

In one embodiment, up to three different initial receiver QPS vectors are used to improve performance of the optimum sampling-time estimation. Also, in one embodiment, the sequential channel estimation is performed by setting the transmitter (and receiver) weight vector to N columns of matrix H, one at time, and measuring N corresponding scalar channel estimates sequentially. Each channel estimation stage consists of N estimation intervals such that if V is the resulting 1×N (N×1) estimate vector, then the channel estimate is VH*(H*V)

The received signal should be neither saturated nor over-attenuated during each timing-recovery or iteration step, where transmit or receive phase patterns are swept through columns of H. Hence, an Automatic Gain Control (AGC) procedure is performed before each such step. In one embodiment, in this AGC procedure, an arbitrary symbol sequence covering the same bandwidth is transmitted over the air, while transmit and receive phase patterns are changed in the same fashion as the ensuing step. The received signal energy is measured, and the receiver gain is consequently set to a value such that the received signal is neither saturated nor over-attenuated for all transmit and receive phase patterns. If necessary, this procedure will be repeated a number of times (up to 3) until a suitable gain is found.

Figure 5:
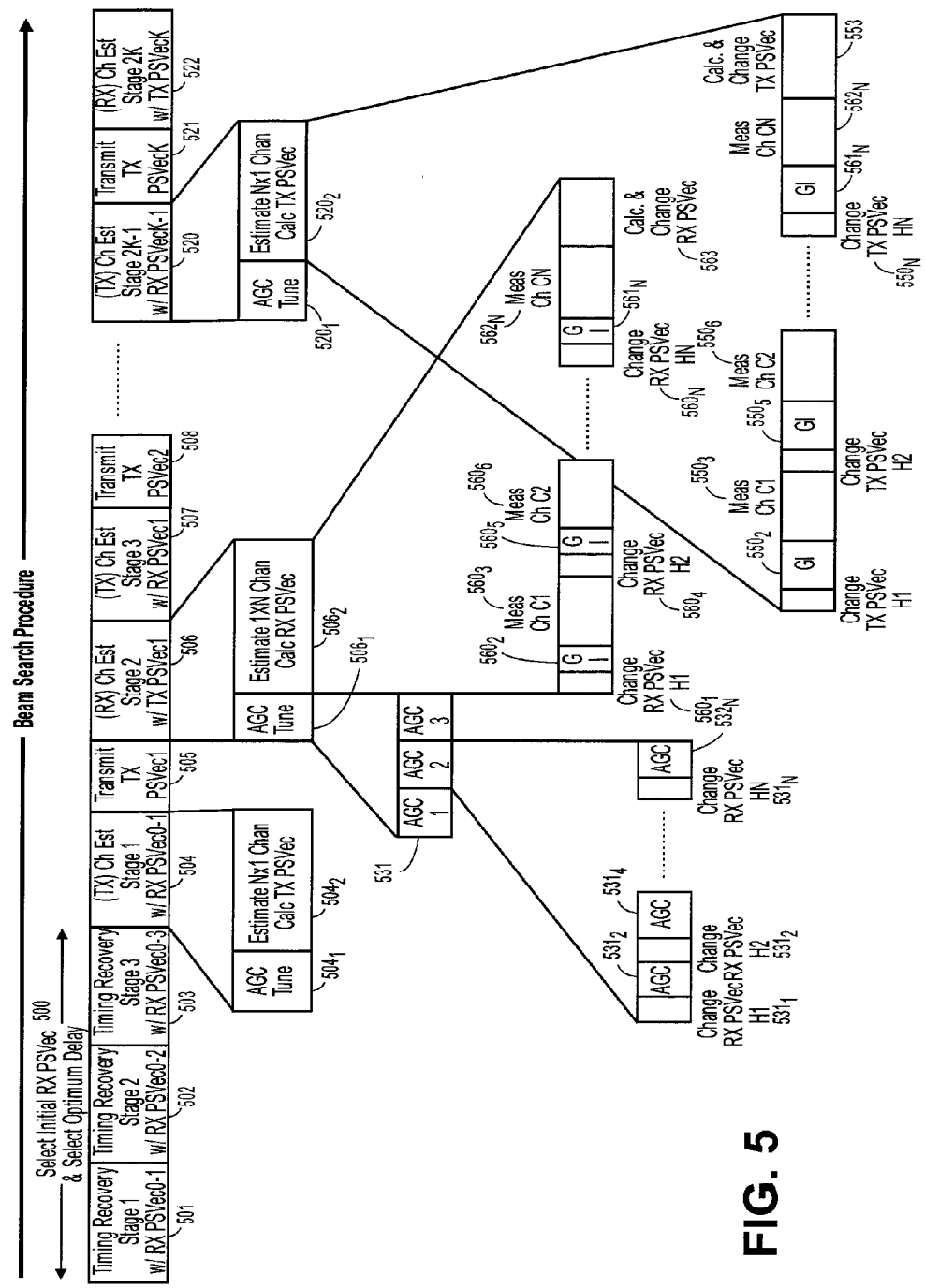
FIG. 5 illustrates stages of one embodiment of the beam search process.

FIG. 5 illustrates stages of one embodiment of the beam search process described above. Referring to FIG. 5, stages 501-503 represent timing recovery stages. During these stages, the initial receiver phase shift vectors and the optimum delay are selected. In one embodiment, during stages 501 and 502, the transmit energy is fixed.

After stage 503, a series of iterations is performed. Each iteration consists of three blocks, with stages 504-506 representing an example of one iteration. Stage 504 is a transmit channel estimate stage using a fixed receive phase pattern in which the receiver vectors that give the best energy are selected and used to estimate the channel. As shown, stage 504 includes automatic gain control 504, along with a block in which the receiver generates a N×1 channel estimate using received vectors and calculates the transmit phase shift vector in substage $504_2$. The operations of substage $504_2$ are depicted in block form shown as an expanded version of substage $520_2$ (since all the block are the same). Initially, the transmit phase shift vector is changed to H1 (substage $550_1$), with a guard interval (substage $550_2$) inserted to compensate for the phase shift latency. For a change in the transmit weight vectors, the guard interval is larger than the overall delay spread minus the transmit filter delay spread. Then the first channel (Ch1) is measured (block $550_3$). After measuring the channel, the transmit phase shift vector is changed to H2 (substage $550_4$), with a guard interval (substage $550_5$). Then the second channel (Ch2) is measured (substage $550_6$). This continues until the last channel, ChN, is measured. After all the transmit phase shift vectors have been transmitted and the channels estimated, the transmit phase shift vectors are calculated and changed (in preparation for estimating the receiver channel). In one embodiment, the transmitter antenna weight vector that produces the strongest received signal at the receiver is repeated more than once during this stage in order to allow the receiver to compensate for various phase inaccuracies inherent to the transmitter and receiver analog circuits.

After the transmit phase shift vector has been calculated, the receiver sends it back to the transmitter in stage 505. In one embodiment, the receiver additionally sends back the index of the transmitter weight vector that produces the strongest received signal to be used during the next iterations. This may be performed using the backchannel.

Next, the receive channel estimation stage 506 is performed using the fixed transmit phase shift vector. The receive channel estimation stage (stage 506), as well as each of the other receive channel estimation stages, comprises an automatic gain control substage (substage $506_1$) and a 1×N channel estimation and receive phase shift vector calculation stage (substage $506_2$). AGC block $506_1$ is depicted as three AGC blocks 531, numbers 1-3, which are all the same. One of these is shown in more detail and is exemplary of the others. First, the receive phase shift vector is changed to H1 (substage $531_1$) and AGC is performed on that phase shift vector (block $531_2$). Then the receive phase shift vector is changed to H2 (substage $531_3$) and AGC is performed on that phase shift vector (substage $531_4$). This continues for all N receive phase shift vectors.

After AGC substage $506_1$, the channel estimate and receive phase shift vector calculation occurs at substage $506_2$. The operations of substage $506_2$ are depicted in block form and are the same for all such blocks in FIG. 5. Initially, the receive phase shift vector is changed to H1 (substage $560_1$), with a guard interval (substage $560_2$) inserted to compensate for the phase shift latency. For a change in the receive weight vectors, the guard interval is larger than the overall delay spread minus the receive filter delay spread. Then the first channel (Ch1) is measured (substage $560_3$). After measuring the channel, the receive phase shift vector is changed to H2 (substage $560_4$), with a guard interval (substage $560_5$). Then the second channel (Ch2) is measured (substage $560_6$). This continues until the last channel, ChN, is measured. After all the receive phase shift vectors have been transmitted and the channels estimated, the receive phase shift vectors are calculated and changed. In one embodiment, with four iterations, there are fourteen stages.

Automatic Gain Control

The signal sent during AGC tuning intervals uses the same modulation but carries no information.

The AGC gain should be constant during each channel estimation stage. During each stage, either the transmit or receive weight vectors are changed (sweeping through N columns), which results in RSSI fluctuation. In this case, the AGC is run for all N possible weight vectors, the AGC level is fixed to the minimum obtained value, and then N channel estimations are performed.

Figure 6:
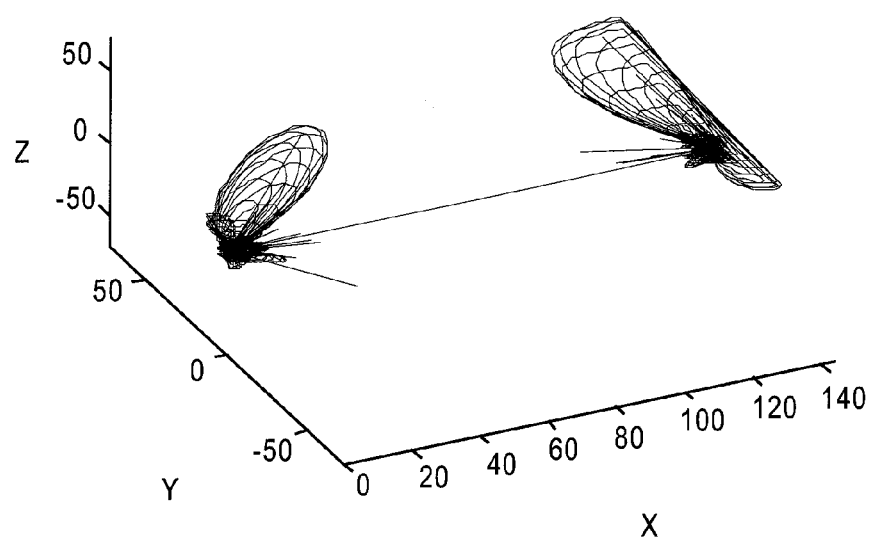
FIG. 6 illustrates a particular beam-forming that resulted from the beam search process of FIG. 5.

FIG. 6 illustrates a particular beam-forming that resulted from the beam search process of FIG. 5.

Figure 7:
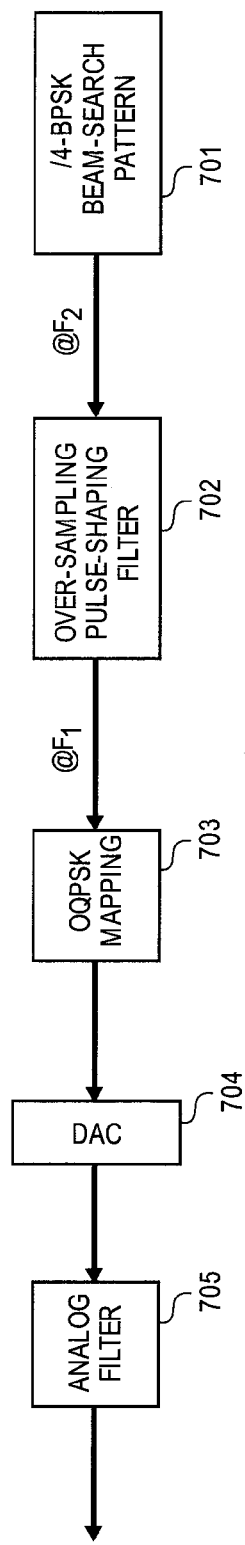
FIG. 7 illustrates one embodiment of a beam search and tracking diagram at the source/transmitter and destination/receiver respectively.

FIG. 7 illustrates one embodiment of a beam search and tracking diagram at the source/transmitter. Referring to FIG. 7, a BPSK beam search pattern 701 is at a frequency of $F_s/2$ is filtered using oversampling coal shaping filter 702, or produces the beam search pattern to a frequency $f_s$. This pattern is then sent to OQPSK mapping 703, which maps the BPSK symbols −1 and 1 to complex QPSK symbols −1−j and 1+j respectively, and delays the Q component by half a sample with respect to the I component. The output of OQPSK mapping 703 is converted to analog using DAC 704 and is then filtered using analog filter 705 prior to transmission.

An Example of a Beam-Tracking Algorithm

Figure 9:
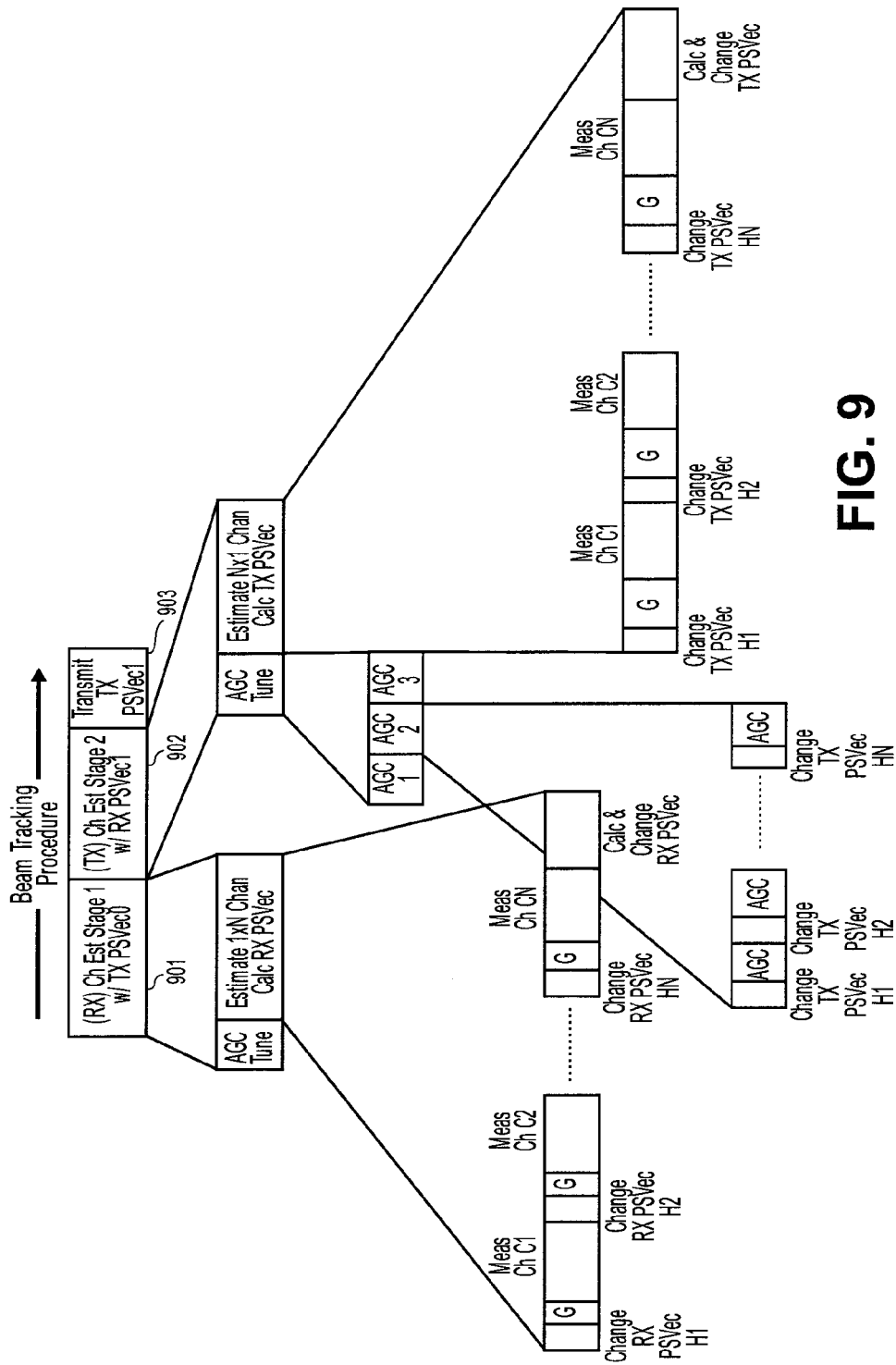
FIG. 9 is a flow diagram of one embodiment of the beam-tracking process.

In one embodiment, the beam-tracking algorithm consists of two iterations of the iterative beam-search process, e.g. the $2^{nd}$ and $3^{rd}$ iterations, described above. FIG. 9 is a flow diagram of one embodiment of the beam-tracking process. Referring to FIG. 9, in the first iteration (shown as block 901), the transmit phase pattern is set equal to the transmit phase vector corresponding to the current beam (i.e., the transmit phase shifts are set to the current estimates), while the receive phase pattern is swept through N columns of H for the current delay. From this operation, the MRC-based receive quantized phase shift vector is calculated. The calculated quantized phase vector is then used as the fixed receive phase pattern for the second iteration (shown as block 902), while the transmit phase pattern is swept through N columns of H and the MRC-based transmit quantized phase shift vectors are calculated. In one embodiment, the transmitter phase pattern that produces the strongest received signal at the receiver is repeated more than once during this stage in order to allow the receiver to compensate for various phase inaccuracies inherent to the transmitter and receiver analog circuits. In each iteration, channel transfer functions are estimated for the same time-delay that was derived in the timing-recovery stage of the beam-search process. The transmitter quantized phase vectors calculated in these iterations are then fed back (903) to be used as the transmit phase patterns. In one embodiment, the index of the weight vector that produces the strongest received signal is additionally fed back to be used during the next beam-tracking instance. Note that blocks 901 and 902 are described in more detail in the same manner as FIG. 5 above.

The same AGC procedure as described above in the beam-search process is performed before each iteration in order to ensure that the received signal is neither saturated nor over-attenuated during the ensuing operation. These are shown in FIG. 9, with example AGC tuning for one channel, which is the same as the others, being shown in detail.

Alternative Embodiments of a Beam-Search Algorithm

Figure 10:
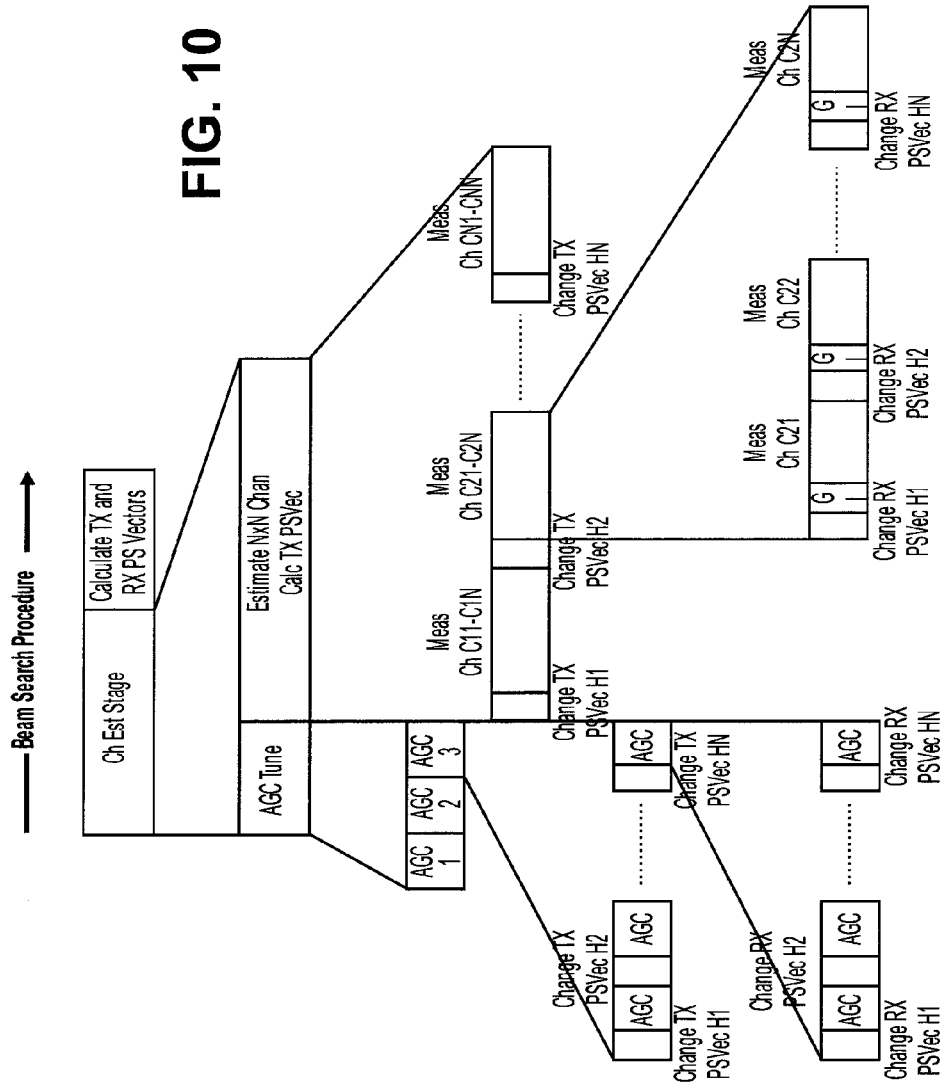
FIG. 10 illustrates an alternative embodiment of a beam-search process.

A second, alternative embodiment of a beam-search process is shown in FIG. 10. Referring to FIG. 10, first, a known symbol sequence is transmitted over the air, which is used to estimate the channel. Next, the transmit phase pattern is set equal to N columns of H one at a time. For each such transmit phase pattern, the receive phase pattern is then set equal to N columns of H one at a time, resulting in N×N different transmit and receive phase pattern combination.

Afterwards, the N×N corresponding SISO channel transfer functions are estimated by matching the received signal with the given symbol sequence at the optimum time-delay (the timing-recovery procedure is similar to the first embodiment of the beam-search process except that all combinations of transmit and receive antenna patterns shall be used). The N×N estimates are used to form an N×N matrix, $\Gamma$. $\Gamma$ is then multiplied by H and transpose of H as in the following equation:

$$G = H\Gamma H^T$$

where G is the MIMO channel transfer function estimate.

The following iteration is then performed for k=1, ..., M:

$$z = \text{conj}(G^T u_{k-1}), v_k = \text{quant}([\Box z_1, \Box z_2, \ldots, \Box z_N])$$

$$w = \text{conj}(G v_{k-1}), u_k = \text{quant}([\Box w_1, \Box w_2, \ldots, \Box w_N])$$

where $u_0$ is the arbitrary initial receive phase pattern.

The above estimation phase is preceded by an AGC procedure similar to the AGC procedure described above. This AGC procedure, which measures the received signal energy for all transmit and phase pattern combinations, and can be repeated a few times as needed, ensures that the received signal is neither saturated nor over-attenuated during the estimation.

APPLICATIONS

In one embodiment, the above beam-forming schemes are applied to a system operating in the 57 to 64 GHZ unlicensed band. Compared to other lower frequency unlicensed bands such as 2.4 GHz and 5 GHz, the 60 GHz band allows usage of much smaller antennas with similar antenna gains. Ideally, 60 GHz antennas can be 12 times smaller than 5 GHz antennas with same gain. This means that a much larger number of antennas can be used without substantially increasing the wireless system dimensions, and hence cost.

Figure 11:
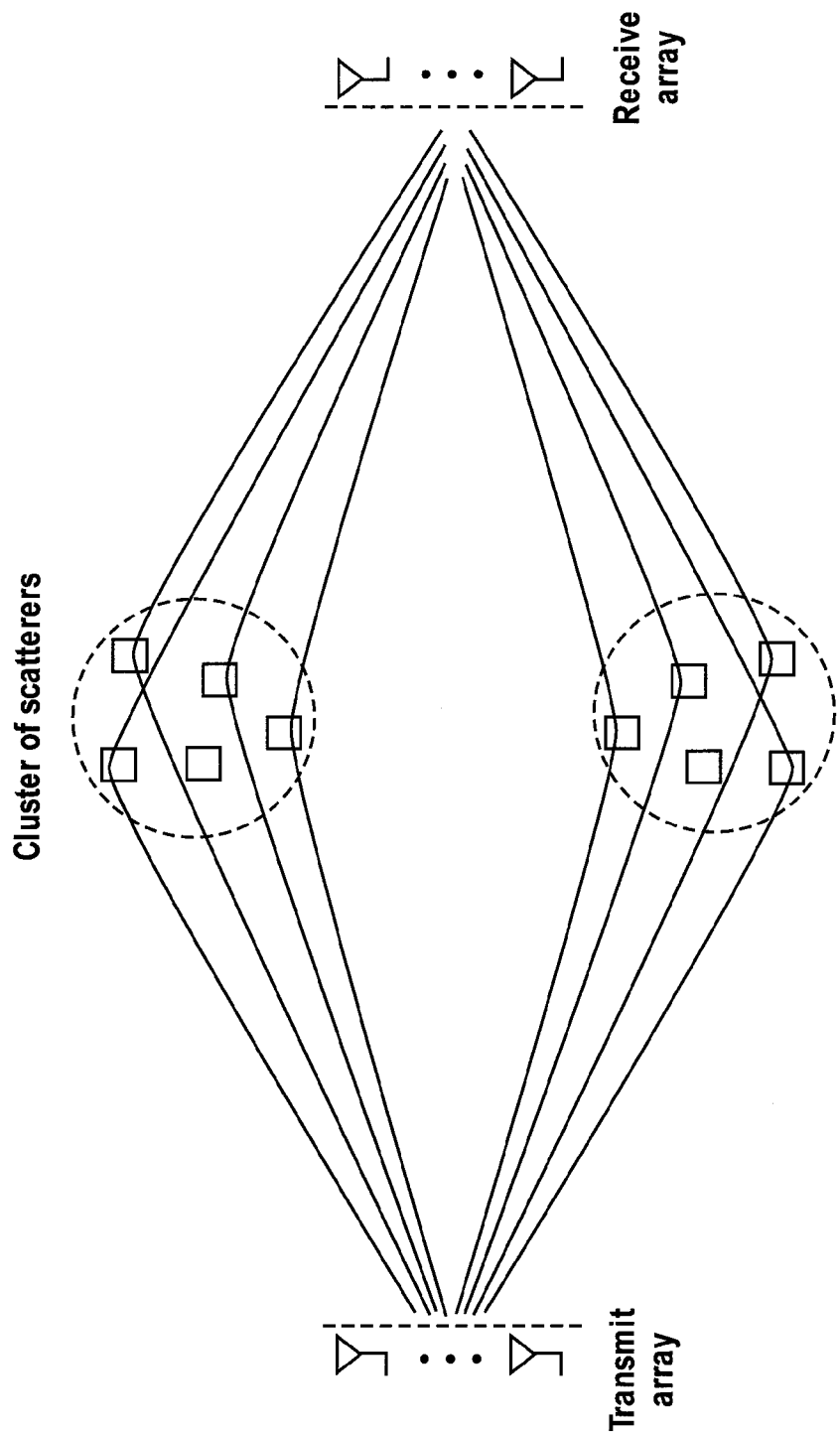
FIG. 11 illustrates the notion of a clustered propagation channel.

In addition, measurements show that the 60 GHz band propagation channel is more clustered than the 2.4 and 5 GHz bands. This is equivalent to saying that for this band the propagation paths can be grouped into distinct clusters. FIG. 11 demonstrates the notion of a clustered propagation channel. The beam-forming process described above is then ideally equivalent to focusing propagation within the cluster with maximum gain. It can be shown for such clustered channels, channel capacity under the beam-forming scheme described herein is often very close to the maximum MIMO channel capacity (achievable via multiplexing as mentioned in the Background Section). In addition, focusing propagation within a cluster means that the propagation delay spread will be equal to the cluster delay-spread which can be significantly lower than overall channel delay-spread.

Therefore, the proposed beam-forming method is very suitable for wireless applications in the 60 GHz band.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
performing adaptive beam steering using multiple transmit and receive antennas, including iteratively performing a pair of training sequences, wherein said iteratively performing the pair of training sequences includes estimating a transmitter antenna-array weight vector and a receiver antenna-array weight vector, and wherein said iteratively performing the pair of training sequences includes alternatively changing transmit and receive phase patterns for a plurality of iterations.

2. The method defined in claim 1 wherein the receive antennas are coupled to one or more digitization paths, and wherein the one or more digitization paths are less in number than the number of receive antennas.

3. The method defined in claim 1 wherein the transmit antennas are coupled to one or more transmit signal generation paths, and wherein the one or more transmit signal generation paths are less in number than the number of transmit antennas.

4. The method defined in claim 1 wherein performing adaptive beam steering comprises:
performing adaptive beam forming that includes a beam search process to identify a beam direction; and
performing a beam tracking process to track the beam during a data transfer phase.

5. The method defined in claim 1 wherein the pair of training sequences occurs over the same multiple-input multiple-output (MIMO) channel.

6. The method defined in claim 1 wherein estimating a transmitter antenna-array weight vector and a receiver antenna-array weight vector are performed at the receiver.

7. The method defined in claim 1 wherein weights in the antenna-array weight vectors are limited to phase shifts, and activating and deactivating of the antennas, only.

8. The method defined in claim 1 wherein the receive weight vector is set while estimating the transmitter antenna-array weight vector and the transmit weight vector is set while estimating the receiver antenna-array weight vector.

9. The method defined in claim 1 wherein performing adaptive beam steering using multiple transmit and receive antennas comprises iteratively performing a set of operations, the set of operations including
(a) setting a receive weight vector for receive antennas based on an initial weight or phase shift, vector;
(b) sequentially measuring channel gains corresponding to each phase to form a first set of channel gains;
(c) calculating a second weight vector based on the first set of channel gains;
(d) setting transmit phase shifts for transmit antennas based on the second weight vector;
(e) sequentially measuring channel gains at the receiver corresponding to each phase to form a second set of channel gains; and
(f) calculating a third weight vector based on the second set of measured channel gains.

10. The method defined in claim 1 wherein the alternatively changing the transmit and receive phase patterns converges towards an optimal value corresponding to a beam direction to be used for beam forming.

11. The method defined in claim 4 wherein the beam search and beam tracking processes are performed either by request from the transmitter or the receiver, or at regularly scheduled intervals.

12. The method defined in claim 4 wherein performing the beam tracking process comprises performing a single iteration of the pair of training sequences.

13. The method defined in claim 6 further comprising feeding back the estimated transmitter antenna-array weight vector to the transmitter.

14. The method defined in claim 9 further comprising:
estimating a first channel from the first set of channel gains, wherein calculating the second phase shift vector is based on the estimate of the first channel; and
estimating a second channel from the second set of channel gains, wherein calculating the third phase shift vector is based on the estimate of the second channel.

15. The method defined in claim 14 wherein estimating the first channel comprises estimating channel vector elements one at a time, wherein a number of sequential estimation slots is set to a number.

16. The method defined in claim 15 wherein the number of sequential estimations and the number of different transmit antenna weight vectors are equivalent.

17. The method defined in claim 9 wherein the sequence of operations further comprises transmitting a known training sequence to the receiver.

18. The method defined in claim 9 wherein the set of operations further comprises using the third phase shift vector in place of the first phase shift vector when setting receive phase shifts for the receive antennas for a next iteration, and then repeating operations (a) through (f).

19. The method defined in claim 9 wherein the first, second and third phase shift vectors are antenna-array weight vectors.

20. The method defined in claim 9 further comprising sending the second phase shift vector from the receiver to the transmitter using a reverse channel.

21. The method defined in claim 20 wherein the channel has a lower rate of transfer than the channel resulting from beamforming.

22. The method defined in claim 9 further comprising additionally sending the index of the transmitter phase vector that produces the strongest received signal at the receiver during the sequential estimation of the first channel.

23. The method defined in claim 9 wherein iteratively performing the set of operations occurs if the transmitter and receiver are in idle mode or if a beam formed between the transmitter and receiver becomes obstructed.

24. The method defined in claim 9 further comprising performing timing recovery prior to iteratively performing the set of operations.

25. The method defined in claim 9 further comprising performing delay estimation prior to iteratively performing the set of operations to determine the arrival time of the beam with maximum gain.

26. The method defined in claim 25 wherein performing delay estimation comprises:
transmitting a known symbol sequence over the air using transmit antennas; and
matching the known symbol sequence at a receiver via a matched filter.

27. An apparatus comprising:
a transceiver having a first digital baseband processing unit coupled to a first phased array-antenna; and
a receiver having a second digital baseband processing unit coupled to a second phased array-antenna, wherein the first and second digital baseband processing units cooperate to perform adaptive beam steering, using multiple transmit and receive antennas, by iteratively performing a pair of trainings, wherein the pair of trainings includes estimating a transmitter antenna-array weight vector and a receiver antenna-array weight vector, and wherein said iteratively performing the pair of training sequences includes alternatively changing transmit and receive phase patterns for a plurality of iterations.

28. The apparatus defined in claim 27 wherein the receive antennas are coupled to one or more digitization paths, and wherein the number of digitization paths are less in number than the number of receive antennas.

29. The method defined in claim 27 wherein the transmit antennas are coupled to one or more transmit signal generation paths, and wherein the number of transmit signal generation paths are less in number than the number of transmit antennas.

30. The apparatus defined in claim 27 wherein the first and second digital baseband processing units cooperate to perform adaptive beam steering by
performing adaptive beam forming that includes a beam search process to identify a beam direction; and
performing a beam tracking process to track the beam during a data transfer phase.

31. The apparatus defined in claim 27 wherein estimating a transmitter antenna-array weight vector and a receiver antenna-array weight vector are performed at the receiver.

32. The apparatus defined in claim 27 further comprising a feedback channel to feed back the estimated transmitter antenna-array weight vector to the transmitter.

33. The apparatus defined in claim 27 wherein the receive weight vector is set while estimating the transmitter antenna-array weight vector and the transmit weight vector is set while estimating the receiver antenna-array weight vector.

34. The apparatus defined in claim 27 wherein the first and second digital baseband processing units cooperate to perform adaptive beam steering by using a set of operations performed iteratively, the set of operations including
(a) the second digital baseband processing unit setting receive phase shifts for receive antennas of the second phased array antenna based on a first weight vector;
(b) the second digital baseband processing unit causing channel gains corresponding to each phase to be sequentially measured and forming a first set of channel gains;
(c) the second digital baseband processing unit calculating a second weight vector based on the first set of channel gains;
(d) the first digital baseband processing unit setting transmit phase shifts for transmit antennas of the first phased array antenna based on the second weight vector;
(e) the second digital baseband processing unit causing channel gains corresponding to each phase to be measured at the receiver and forming a second set of channel gains; and
(f) the second digital baseband processing unit calculating a third weight vector based on the second set of measured channel gains.

35. The apparatus defined in claim 27 wherein the back channel has a lower rate of transfer than the beam-formed channel resulting from beamforming.

36. The apparatus defined in claim 27 wherein the alternatively changing the transmit and receive phase patterns converges towards an optimal value corresponding to a beam direction to be used for beam forming.

37. The apparatus defined in claim 30 wherein the beam tracking process comprises performing a single iteration of the pair of trainings.

38. The apparatus defined in claim 31 wherein the first and second digital baseband processing units cooperate to perform delay estimation by:
the first digital baseband processing unit causing the first phased array antenna to transmit a known symbol sequence over the air; and
the second digital baseband processing unit causing the known symbol sequence to be matched at the receiver via a matched filter.

39. The apparatus defined in claim 34 wherein the second digital baseband processing unit estimates a first channel from the first set of channel gains and calculates the second weight vector based on the estimate of the first channel, and further wherein the first digital baseband processing unit estimates a second channel from the second set of channel gains and calculates the third weight vector based on the estimate of the second channel.

40. The apparatus defined in claim 39 wherein the second digital baseband processing unit estimates the first channel by estimating channel vector elements one at a time, wherein a number of sequential estimation slots is set to a number.

41. The apparatus defined in claim 39 wherein the transmitter antenna weight vector that produces the strongest received signal at the receiver is repeated more than once.

42. The apparatus defined in claim 34 wherein the set of operations further comprises the second digital baseband processing unit using the third weight vector in place of the first weight vector when setting receive phase shifts for the receive antennas for a next iteration, and then repeating operations (a) through (f).

43. The apparatus defined in claim 34 further comprises a back channel, wherein the second digital baseband processing unit sends the second weight vector from the receiver to the transmitter using the back channel.

44. The apparatus defined in claim 43, wherein the second digital baseband processing unit sends an index of the transmit phase shift vector that produced the strongest received signal at the receiver during the sequential estimation of the first channel, from the receiver to the transmitter using the back channel.

45. The apparatus defined in claim 34 wherein the set of operations are iteratively performed if the transmitter and receiver are in idle mode or if a beam formed between the transmitter and receiver becomes obstructed.

46. The apparatus defined in claim 34 wherein the set of operations is performed for four iterations.

47. The apparatus defined in claim 34 wherein the first and second digital baseband processing units cooperate to perform timing recovery prior to iteratively performing the set of operations.

48. The apparatus defined in claim 34 wherein the first and second digital baseband processing units cooperate to perform delay estimation prior to iteratively performing the set of operations to determine the arrival time of the beam with maximum gain.

49. A method comprising:
performing adaptive beam forming that includes performing a beam search process to identify a beam direction, wherein said performing adaptive beam forming comprises iteratively performing a pair of training sequences that alternatively change transmit and receive phase patterns for a plurality of iterations, and wherein the iteratively performing converges towards an optimal value corresponding to the beam direction to be used for beam forming; and
performing a beam tracking process during a data transfer state to track the beam.

50. The method defined in claim 49 wherein performing the beam tracking process comprises performing a single iteration of a pair of trainings, wherein the pair of trainings includes estimating a transmitter antenna-array weight vector and a receiver antenna-array weight vector.

51. A transmitter for use in communication with a receiver, the transmitter comprising:
a processor; and
a phased away beamforming antenna, wherein the processor controls the antenna to perform adaptive beam steering using multiple transmit antennas in conjunction with receive antennas of the receiver by iteratively performing a set of training operations, wherein said iteratively performing the pair of training operations comprises alternatively changing transmit and receive phase patterns for a plurality of iterations, wherein one of the training operations comprises the processor causing the phased away beamforming antenna to transmit a first training sequence while a receive antenna-array weight vector of the receiver is set and a transmitter antenna-array weight vector switches between weight vectors with a set of weight vectors, and further wherein another of the training operations comprises the processor causing the phased away beamforming antenna to transmit a second training sequence while a transmitter antenna-array weight vector is set as part of a process to calculate the receive antenna-array weight vector.

52. A receiver for use in communication with a transmitter, the receiver comprising:
a processor; and
a phased away beamforming antenna, wherein the processor controls the antenna to perform adaptive beam steering using multiple receive antennas in conjunction with transmit antennas of the transmitter by iteratively performing a set of training operations, wherein said iteratively performing the pair of training operations comprises alternatively changing transmit and receive phase patterns for a plurality of iterations, wherein one of the training operations comprises the processor setting a receive antenna-array weight vector during a process for estimating a transmit antenna-array weight vector by having the transmitter transmit a first training sequence while the receive antenna-array weight vector is set, and further wherein another of the training operations comprises the processor calculate the receive antenna-array weight vector when the transmitter transmits a second training sequence while the transmitter antenna-array weight vector is set.

* * * * *

UNITED STATES PATENT AND TRADEMARK OFFICE
CERTIFICATE OF CORRECTION

| | | |
|---|---|---|
| PATENT NO. | : 7,710,319 B2 | Page 1 of 1 |
| APPLICATION NO. | : 11/706711 | |
| DATED | : May 4, 2010 | |
| INVENTOR(S) | : Karim Nassiri-Toussi et al. | |

It is certified that error appears in the above-identified patent and that said Letters Patent is hereby corrected as shown below:

Column 17

Line 24, delete "$([\Box z_1, \Box z_2, \ldots, \Box z_N])$" and substitute -- $([\angle Z_1, \angle Z_2, \ldots, \angle Z_N])$ -- in its place.

Line 26, delete "$([\Box w_1, \Box w_2, \ldots, \Box w_N])$" and substitute -- $([\angle W_1, \angle W_2, \ldots, \angle W_N])$ -- in its place.

Column 20

Line 14, delete "method" and substitute -- apparatus -- in its place.

Signed and Sealed this
Eighth Day of March, 2011

David J. Kappos
*Director of the United States Patent and Trademark Office*

UNITED STATES PATENT AND TRADEMARK OFFICE
CERTIFICATE OF CORRECTION

PATENT NO. : 7,710,319 B2
APPLICATION NO. : 11/706711
DATED : May 4, 2010
INVENTOR(S) : Karim Nassiri-Toussi et al.

It is certified that error appears in the above-identified patent and that said Letters Patent is hereby corrected as shown below:

In the claims

In claim 51, Column 22, Line 21; delete the word "away", insert the word --array--.

In claim 52, Column 22, Line 43; delete the word "away", insert the word --array--.

Signed and Sealed this
Twelfth Day of July, 2016

Michelle K. Lee
*Director of the United States Patent and Trademark Office*